US012808802B2

(12) United States Patent
Higgins et al.

(10) Patent No.: US 12,808,802 B2
(45) Date of Patent: Nov. 24, 2026

(54) APPARATUS FOR DETECTING OPTICAL SIGNALS

(71) Applicant: SEEGENE, INC., Seoul (KR)

(72) Inventors: Simon Philip Adam Higgins, Dingley Village (AU); Trevor David Shields, Berwick (AU); Stuart John Knowles, Oakleigh (AU); Walson Lawi, Caulfield North (AU)

(73) Assignee: SEEGENE, INC., Seoul (KR)

( * ) Notice: Subject to any disclaimer, the term of this patent is extended or adjusted under 35 U.S.C. 154(b) by 908 days.

(21) Appl. No.: 18/183,309

(22) Filed: Mar. 14, 2023

(65) Prior Publication Data

US 2024/0310282 A1 Sep. 19, 2024

(51) Int. Cl.
*G01N 21/64* (2006.01)

(52) U.S. Cl.
CPC ... *G01N 21/6452* (2013.01); *G01N 2201/021* (2013.01); *G01N 2201/0853* (2013.01)

(58) Field of Classification Search
CPC ........... G01N 21/645; G01N 2201/021; G01N 2201/0853
USPC ...................................................... 250/458.1
See application file for complete search history.

(56) References Cited

U.S. PATENT DOCUMENTS 4,683,195 A 7/1987 Mullis et al.
4,683,202 A 7/1987 Mullis
4,800,159 A 1/1989 Mullis et al.
6,469,311 B1 * 10/2002 Modlin .............. G01N 21/6408 250/576
8,236,504 B2 8/2012 Kordunsky et al.
8,797,526 B2 * 8/2014 Cherubini .......... G01N 21/6452 436/517
2012/0313008 A1 * 12/2012 Jo ...................... G01N 21/6452 250/216

* cited by examiner

*Primary Examiner* — Carolyn Fin
(74) *Attorney, Agent, or Firm* — Harness, Dickey & Pierce, P.L.C.

(57) ABSTRACT

An apparatus for detecting optical signals according to the present disclosure includes a movable mount for carrying a set of light guides, the set of light guides having an excitation light guide and an emission light guide; an excitation light engine module for providing light to the excitation light guide; and an emission light detector module for detecting light from the emission light guide, wherein each distal end of the excitation light guide and the emission light guide are respectively connected to the excitation light engine module and the emission light detector module, wherein each proximal end of the excitation light guide and the emission light guide are both connected to the movable mount, and moved via the movable mount to be in optical communication with one reaction cavity at a time, among a plurality of reaction cavities.

14 Claims, 9 Drawing Sheets

APPARATUS FOR DETECTING OPTICAL SIGNALS

FIELD

The present disclosure relates to an apparatus for detecting optical signals in a sample area.

BACKGROUND

Recently, people's interest in health have been growing along with prolonged human life expectancy. Thus, the importance of accurate analysis of pathogens and in vitro nucleic acid-based molecular diagnosis such as genetic analysis for a patient has increased significantly, and the demand therefor is on the rise.

Generally, nucleic acid-based molecular diagnosis is performed by extracting nucleic acids from a sample and confirming whether a target nucleic acid is present in the extracted nucleic acids.

The most widely used nucleic acid amplification reaction, which is well-known as a Polymerase Chain Reaction (PCR), repeats a cyclic process which includes denaturation of a double-stranded DNA, annealing of an oligonucleotide primer with a denatured DNA template, and extension of the primer by a DNA polymerase (Mullis et al.; U.S. Pat. Nos. 4,683,195, 4,683,202 and 4,800,159; Saiki et al., (1985) Science 230, 1350-1354).

Recently, various nucleic acid amplification apparatuses have been developed for performing nucleic acid amplification reactions. In the prior art, such apparatuses are configured to mount a vessel containing a sample solution including a template nucleic acid in one reaction chamber, and to perform a nucleic acid amplification reaction by repeatedly heating and cooling the vessel.

In order to amplify a deoxyribonucleic acid (DNA) having a specific nucleotide sequence, the apparatus for a nucleic acid amplification reaction may perform a denaturing step, an annealing step, and an extension (or amplification) step.

The DNA denaturation is performed at about 95° C., and the annealing and extension of primers are performed at a temperature of 55° C. to 75° C. which is lower than 95° C. Light sources emit excitement light to samples, and fluorescent materials in the samples which are excited by the excitation light emit fluorescence. Detectors are configured to sense the emission light emitted from the fluorescent materials to analyze amplification reaction. Thus, in apparatuses used for such optical signal detections, excitation light must be properly directed to the samples and likewise, emission light to the detectors.

An excitation filter may be disposed in an excitation light path between a light source and sample in order to excite a specific optical label to be detected among optical labels in the sample. Here, the excitation filter selectively passes light of a specific wavelength range, among the light radiated from the light source.

In a similar manner, in order to detect emission light emitted from the specific optical label, a filter for a detector is disposed in an emission light path between the sample and the detector to selectively pass the emission light emitted from the specific optical label among the light radiated from the sample. This way, noise can be reduced, and fluorescence can be precisely detected.

Meanwhile, in order to detect different optical labels among several in a sample, a multiple of excitation filters and emission filters are required, but existing apparatuses are mostly designed for a single combination of excitation and emission wavelengths and are often configured to allow only one label to be detected at a time. Thus, as the number of samples that need detection increases, the longer it takes to complete the optical signal detection task.

According to conventional detection methods and apparatuses, it is difficult detect multiple different optical labels at a time, due to risks of overlapping excitation and emission wavelengths of entering one detector. Such overlapping wavelengths would lead to incorrect results, and in order to avoid such errors, the detection process usually involves detecting one optical label at a time for each sample. Thus, detecting multiple different optical labels at once in parallel is not an option for conventional configurations. As such, there is a limit in reducing the time it takes to complete such repetitive light radiation and detection process for a plurality of samples.

Therefore, it is necessary to develop an improved apparatus for detecting optical signals that overcomes these disadvantages.

Patent Document (Patent document 1) U.S. Pat. No. 8,236,504 (Aug. 7, 2012)

SUMMARY

Technical Task

Embodiments of the present disclosure provide optical signal detection in a thermal cycling apparatus.

The technical tasks to be solved by the present disclosure are not limited to the aforementioned technical task.

Means for Solving the Task

According to one aspect of the present disclosure, an apparatus for detecting optical signals, may include: a movable mount for carrying a set of light guides, the set of light guides having an excitation light guide and an emission light guide; an excitation light engine module for providing light to the excitation light guide; and an emission light detector module for detecting light from the emission light guide, wherein each distal end of the excitation light guide and the emission light guide may be respectively connected to the excitation light engine module and the emission light detector module, wherein each proximal end of the excitation light guide and the emission light guide may both be connected to the movable mount, and moved via the movable mount to be in optical communication with one reaction cavity at a time, among a plurality of reaction cavities.

According to another aspect of the present disclosure, the movable mount may carry two or more sets of light guides.

According to another aspect of the present disclosure, the movable mount may move the proximal end of each set of light guides to follow a predetermined path designed for positioning each set of light guides to be in optical communication with one reaction cavity at a time.

According to another aspect of the present disclosure, the plurality of reaction cavities may be assigned into a plurality of sample groups, and the proximal end of each set of light guides may be arranged on the movable mount such that one set of light guides is designated for guiding optical signals to and from one respective sample group.

According to another aspect of the present disclosure, among the plurality of sample groups, a first sample group and a second sample group may be respectively irradiated via a first light source and a second light source provided in the excitation light engine module.

According to another aspect of the present disclosure, one reaction cavity from the first sample group and one reaction cavity from the second sample group may be irradiated with excitation light of different wavelength spectra at the same time.

According to another aspect of the present disclosure, emission light emitted from one reaction cavity from the first sample group and one reaction cavity from the second sample group may be respectively detected via a first detector and a second detector provided in the emission light detector module.

According to another aspect of the present disclosure, the movable mount may be moved by a motor unit, the motor unit having an x-axis motor and a y-axis motor.

According to another aspect of the present disclosure, the motor unit may be connected to a support structure disposed above a thermal module for applying specific temperature cycles to the plurality of reaction cavities.

According to another aspect of the present disclosure, the plurality of reaction cavities may be disposed underneath the support structure, between the movable mount and the thermal module.

According to another aspect of the present disclosure, the proximal end of each excitation light guide and emission light guide may be connected to the movable mount via a connector having a pick-off mirror for metering light.

According to another aspect of the present disclosure, the excitation light engine module may include one or more light sources, wherein one set of light guides may be installed for each light source.

According to another aspect of the present disclosure, the emission light detector module may include one or more detectors, wherein one set of light guides may be installed for each detector.

According to another aspect of the present disclosure, the number of light sources, the number of detectors, and the number of sets of light guides may be the same.

According to another aspect of the present disclosure, a reaction cavity may be irradiated with two or more excitation light of different wavelength spectra via the excitation light guide.

According to another aspect of the present disclosure, each set of light guides may be designated for guiding optical signals to and from one sample group having a plurality of reaction cavities.

According to another aspect of the present disclosure, the position of the two or more sets of light guides may be moved within each respective designated sample group by the movable mount upon completing a cycle of irradiating excitation light of two or more different wavelength spectra for each reaction cavity.

According to another aspect of the present disclosure, the excitation light of two or more different wavelength spectra may be irradiated at the same time via the two or more sets of light guides, each connected to the excitation light engine module.

According to another aspect of the present disclosure, the excitation light engine module may include, two or more light sources and an excitation rotary wheel having two or more excitation filters, wherein the two or more light sources may each generate light that passes the two or more excitation filters successively as the excitation rotary wheel rotates.

According to another aspect of the present disclosure, emission light of two or more different wavelength spectra may be detected at the same time via the two or more sets of light guides, each connected to the emission light detector module.

According to another aspect of the present disclosure, the emission light detector module may include, two or more detectors and an emission rotary wheel having two or more emission filters, wherein the two or more detectors each detects light that passes the two or more emission filters successively as the emission rotary wheel rotates.

Effect of Invention

According to the embodiments of the present disclosure, it is possible to reduce the time taken to receive detection results, by providing an improved apparatus that enables rapid and accurate detection of multiple different optical labels.

More specifically, a plurality of reaction cavities in the form of a sample well plate may be assigned into a plurality of sample groups in the apparatus of the present disclosure. The sample groups are irradiated with a plurality of light sources via light guides, such as optical fiber bundles, and the emission light from the sample groups are detected via light guides and with detectors. That is, a [light source-optical fiber bundle-detector] set is used for the detection of each sample group, for a plurality of sample groups. Therefore, according to the present disclosure, it is possible to utilize a plurality of [light source-optical fiber bundle-detector] sets to scan an entire sample well plate, which is much faster and efficient as compared to when only one reaction cavity in a sample well plate can be scanned at one time.

In addition to significantly reduced scan time, the light guides, which can be optical fiber bundles, move across a short distance, which allows the minimization of optical loss and deterioration of the durability of the optical fiber bundles.

Further, as compared to other devices having a light source and a detector mounted on a single moving means such that they move as one, the light sources and detectors of the apparatus of the present disclosure are disposed on separate parts of the apparatus, which prevents them from affecting each other and allows accurate and stable measurement.

For example, since the light sources and detectors are disposed separately from each other, and light is transmitted to and from a sample well plate via optical fiber bundles, the light sources and detectors are not affected by vibration caused by movement, nor are they affected by heat from a thermal module or heat lid. More specifically, since the detector is located away from the thermal module (especially the heat lid), the effect of temperature change on detection can be minimized.

DETAILED DESCRIPTION

Figure 1:
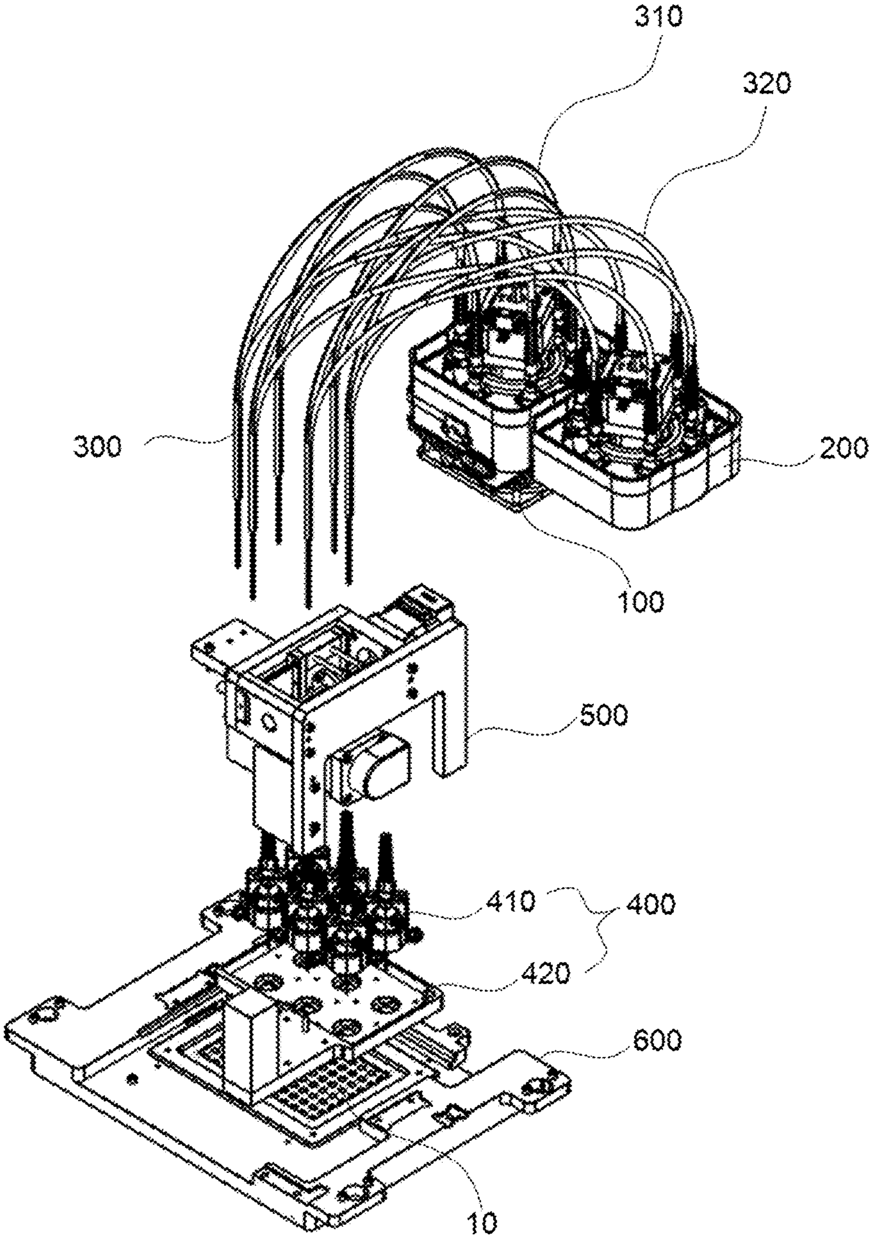
FIG. 1 is an exploded perspective view illustrating an apparatus for detecting optical signals according to an embodiment of the present disclosure.

Hereinafter, the present disclosure will be explained with reference to embodiments and example drawings. The embodiments are for illustrative purposes only, and it should be apparent to a person having ordinary skill in the art that the scope of the present disclosure is not limited to the embodiments.

In addition, in adding reference numerals to the components of each drawing, it should be noted that same reference numerals are assigned to same components as much as possible even though they are shown in different drawings. In addition, in describing the embodiments of the present disclosure, when it is determined that a detailed description of a related well-known configuration or function interferences with the understanding of the embodiments of the present disclosure, the detailed description thereof will be omitted.

In addition, in describing the components of the embodiments of the present disclosure, terms such as first, second, A, B, (a), (b), (i), (ii), etc. may be used. These terms are only for distinguishing the components from other components, and the nature or order of the components is not limited by the terms. When a component is described as being "connected," "coupled" or "fastened" to other component, the component may be directly connected or fastened to the other component, but it will be understood that another component may be "connected," "coupled" or "fastened" between the components.

The present disclosure relates to an apparatus for detecting a target analyte in a sample.

As used herein, the term "sample" may include a biological sample (e.g., cells, tissues and fluids from a biological source) and a non-biological sample (e.g., food, water and soil). Examples of the biological sample may include viruses, bacteria, tissues, cells, blood (e.g., whole blood, plasma and serum), lymph, bone marrow fluid, salvia, sputum, swab, aspiration, milk, urine, feces, ocular fluid, semen, brain extract, spinal fluid, joint fluid, thymus fluid, bronchoalveolar lavage fluid, ascites and amniotic fluid. Also, the sample may include natural nucleic acid molecules isolated from a biological source and synthetic nucleic acid molecules. According to an embodiment of the present disclosure, the sample may include an additional substance such as water, deionized water, saline solution, pH buffer, acid solution or alkaline solution.

A target analyte refers to a substance that is the subject of analysis. The analysis may mean obtaining information on, for example, the presence, amount, concentration, sequence, activity or property of the analyte in the sample. The analyte may include various substances (e.g., biological substance and non-biological substance such as compounds). Specifically, the analyte may include a biological substance such as nucleic acid molecules (e.g., DNA and RNA), proteins, peptides, carbohydrates, lipids, amino acids, biological compounds, hormones, antibodies, antigens, metabolites or cells. According to an embodiment of the present disclosure, the analyte may be nucleic acid molecules.

The apparatus for detecting a target analyte of the present disclosure may be an apparatus for detecting a target nucleic acid. The apparatus for detecting a target nucleic acid allows a nucleic acid reaction to be performed in a sample, to detect a target nucleic acid.

The nucleic acid reaction refers to sequential physical and chemical reactions which generate a signal depending on the presence of a nucleic acid of a specific sequence in the sample or the amount thereof. The nucleic acid reaction may include the binding of a nucleic acid of a specific sequence in a sample to other nucleic acids or substances, or replication, cleavage or decomposition of a nucleic acid of a specific sequence in the sample. The nucleic acid reaction may involve a nucleic acid amplification reaction. The nucleic acid amplification reaction may include amplification of a target nucleic acid. The nucleic acid amplification reaction may specifically amplify the target nucleic acid.

The nucleic acid reaction may be a signal-generation reaction which can generate a signal depending on the presence/absence of a target nucleic acid in the sample or the amount thereof. The signal-generation reaction may be a technique of genetic analysis such as PCR, real-time PCR or microarray.

Various methods for generating an optical signal which indicates the presence of a target nucleic acid using a nucleic acid reaction are known. Representative examples thereof include the following: TaqMan™ probe method (U.S. Pat. No. 5,210,015), molecular beacons method (Tyagi et al., Nature Biotechnology v.14 March 1996), scorpion method (Whitcombe et al., Nature Biotechnology 17:804-807 (1999)), sunrise or amplifluor method (Nazarenko et al., 2516-2521 Nucleic Acids Research, 25(12):2516-2521 (1997), and U.S. Pat. No. 6,117,635), lux method (U.S. Pat. No. 7,537,886), CPT (Duck P, et al., Biotechniques, 9:142-148(1990)), LNA method (U.S. Pat. No. 6,977,295), plexor method (Sherrill CB, et al,, Journal of the American Chemical Society, 126:4550-4556(2004)), Hybeacons™ (D. J. French, et al., Molecular and Cellular Probes (2001) 13, 363-374 and U.S. Pat. No. 7,348,141), dual-labeled, self-quenched probe (U.S. Pat. No. 5,876,930), hybridization probe (Bernard PS, et al., Clin Chem 2000, 46, 147-148), PTOCE (PTO cleavage and extension) method (WO 2012/096523), PCE-SH (PTO Cleavage and Extension-Dependent Signaling Oligonucleotide Hybridization) method (WO 2013/115442), PCE-NH (PTO Cleavage and Extension-Dependent Non-Hybridization) method (PCT/KR2013/012312) and CER method (WO 2011/037306).

An apparatus for detecting optical signals according to an embodiment of the present disclosure, hereinafter referred to as a "detection apparatus," may be employed in an apparatus or system for detecting a target analyte such as a nucleic acid. The detection apparatus for detecting optical signals according to an embodiment of the present disclosure may detect a signal generated depending on the presence of the target nucleic acid. An apparatus or system for detecting a target analyte configured to include the detection apparatus of the present disclosure may also include a nucleic acid amplifier.

The optical signal may be a luminescence signal, phosphorescence signal, chemiluminescence signal, fluorescence signal, polarized fluorescence signal or other colored signal. The optical signal may be generated in response to an optical stimulus given to the sample.

A nucleic acid amplifier refers to an apparatus for performing a nucleic acid amplification reaction which amplifies a nucleic acid having a specific nucleotide sequence. Examples of the method for amplifying a nucleic acid include polymerase chain reaction (PCR), ligase chain reaction (LCR) (U.S. Pat. Nos. 4,683,195 and 4,683,202; PCR Protocols: A Guide to Methods and Applications (Innis et al., eds, 1990)), strand displacement amplification (SDA) (Walker, et al. Nucleic Acids Res. 20(7):1691-6 (1992); Walker PCR Methods Appl 3(1):1-6 (1993)), transcription-mediated amplification (Phyffer, et al., J. Clin. Microbiol. 34:834-841 (1996); Vuorinen, et al., J. Clin. Microbiol. 33:1856-1859 (1995)), nucleic acid sequence-based amplification (NASBA) (Compton, Nature 350(6313):91-2 (1991)), rolling circle amplification (RCA) (Lisby, Mol. Biotechnol. 12(1):75-99 (1999); Hatch et al., Genet. Anal. 15(2):35-40 (1999)), Q-beta Replicase (Lizardi et al., BiolTechnology 6:1197 (1988)), and loop-mediated isothermal amplification assay (LAMP) (Notomi, T et al., Nucleic Acids Res. 28(12):E63 (2000)), etc.

The above-mentioned nucleic acid amplifier may carry out a denaturing step, an annealing step and an extension (or elongation) step to amplify deoxyribonucleic acid (DNA) having a specific base sequence.

In the denaturing step, a sample and reagent solution containing double-stranded DNA templates is heated to a specific temperature, for example about 95° C., to separate double-stranded DNA into single-stranded DNA. In the annealing step, an oligonucleotide primer having a nucleotide sequence complementary to the nucleotide sequence of a nucleic acid to be amplified is provided, and the primer and the separated single-stranded DNA are cooled down to a specific temperature, for example 60° C., to promote the primer binding to the specific nucleotide sequence of the single-stranded DNA to form a partial DNA-primer complex. In the extension step, the solution is maintained at a specific temperature, for example 72° C., after the annealing step to form double-stranded DNA by DNA polymerase based on the primer of the partial DNA-primer complex.

The aforementioned three steps are repeated, for example 10 to 50 times, geometrically amplifying DNA having the specific nucleotide sequence. In some cases, the nucleic acid amplifier may perform the annealing step and extension step simultaneously. In this case, the nucleic acid amplifier may complete one cycle by performing two steps including a denaturing step and an annealing/extension step.

Particularly, a detection apparatus according to an embodiment may be used together with such a nucleic acid amplifier for performing a nucleic acid amplification reaction with temperature changes. As the amplification reaction takes place, an optical signal is generated depending on the presence of a nucleic acid and the detection apparatus is capable of detecting the generated optical signal.

FIG. 1 is an exploded perspective view illustrating an apparatus for detecting optical signals according to an embodiment of the present disclosure. As shown in FIG. 1, the detection apparatus according to an embodiment of the present disclosure includes an excitation light engine module 100, an emission light detector module 200, light guides 300 connected to each of the excitation light engine module 100 and emission light detector module 200, a movable mount 400 for moving the light guides 300, a motor unit 500 for driving the movable mount 400, and a support structure 600 under which a plurality of reaction cavities 10 that can receive samples are disposed.

The excitation light engine module 100 provides light to the light guides, and the emission light detector module 200 is configured to detect emission light from the light guides. The light guides may be installed to the excitation light engine module 310 and the emission light detector module 200 as a set of light guides 300 having an excitation light guide 310 and an emission light guide 320. The set of light guides 300 may take form of a bifurcated optic fiber bundle.

More specifically, the excitation light guide 310 and the emission light guide 320 may be respectively connected to the excitation light engine module 100 and the emission light detector module 200 by their distal ends, whereas their proximal ends may be connected to the movable mount 400.

As the excitation light engine module 100 emits excitation light, the excitation light guide 310 may route the excitation light past the movable mount 400 to a predetermined reaction cavity 10. Then, light emitted from the predetermined reaction cavity 10 may be routed to the emission light detector module 200 via the emission light guide 320.

The movable mount 400 may include a guide head 410 and a mount base 420 where the guide head 410 is mounted. As shown in FIG. 1, there may be a plurality of guide heads 410 installed, one guide head 410 for each set of light guides 300. The number of guide heads 410 may be determined by how many sets of light guides 300 are needed for the detection of all dye-markers with distinct excitation and emission spectra, i.e., fluorescent materials, in all reaction cavities 10.

In one set of light guides 300, the proximal ends of the excitation light guide 310 and the emission light guide 320 may be mounted together on the movable mount 400 to share the same guide head 410. This way, as the movable mount 400 moves above the reaction cavities 10 in a predetermined pattern, the proximal ends of one set of light guides 300 are directed to be in optical communication with one common reaction cavity 10 at a time.

Thus, the movable mount 400 may move the proximal end of each set of light guides 300 to follow a predetermined path designed for positioning each set of light guides 300 to be in optical communication with one reaction cavity 10 at a time.

The movable mount 400 may carry two or more sets of light guides 300, which involves two or more guide heads 410. Since the guide heads 410 are fixed to the mount base 420, as the movable mount 400 moves, the two or more sets of light guides 300 can be moved along the same predetermined pattern above a plurality of reaction cavities 10.

Figure 7:
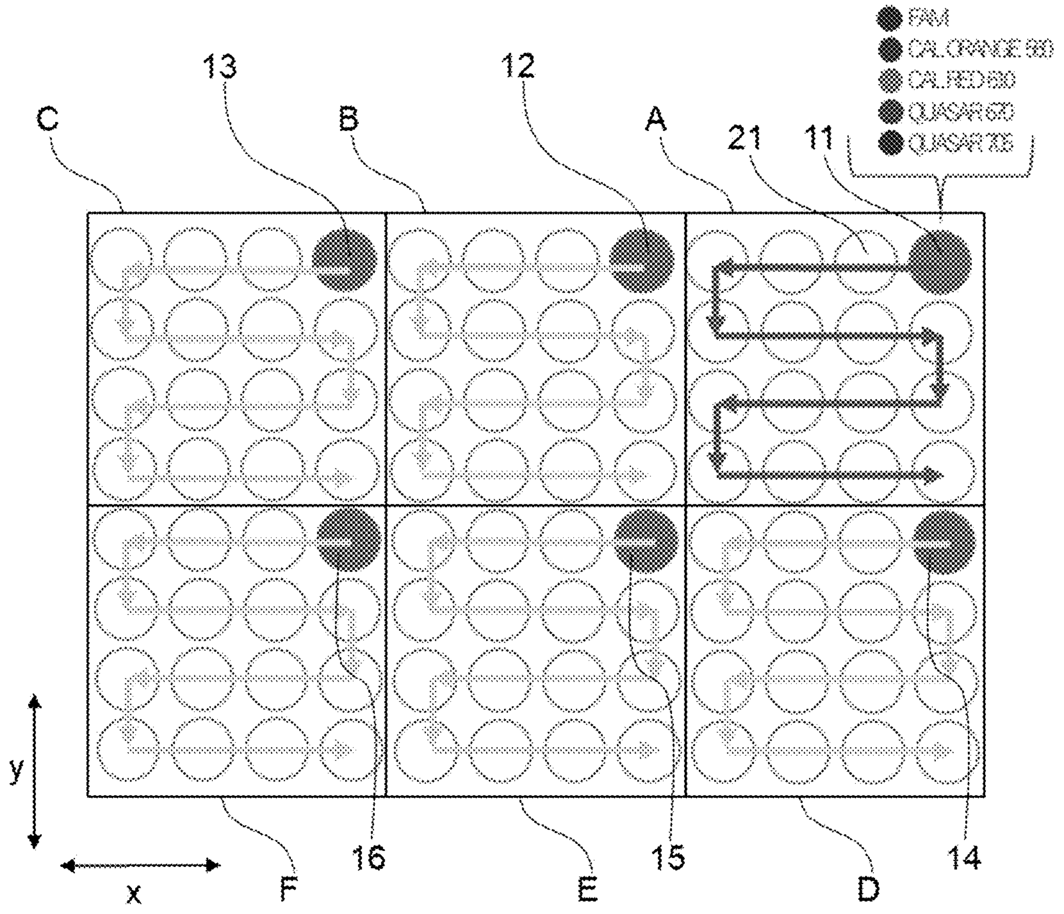
FIG. 7 is a schematic view illustrating a predetermined pattern for irradiating a multiple of reaction cavities at once according to an embodiment of the present disclosure.

Such a predetermined pattern may be a path that the movable mount 400 follows, designed for positioning the proximal end of each set of light guides 300 to be in optical communication with one reaction cavity 10 at a time within a plurality of sample groups (shown as sample groups A and B in FIG. 7).

The motor unit 500 may be connected to the movable mount 400 to drive the movable mount 400 in at least two directions. The motor unit 500 may be connected to the support structure 600 such that the movable mount 400 is kept hovering over the plurality of reaction cavities 10. Here, the plurality of reaction cavities 10 may be arranged in rows and columns, and more particularly, may be 96-sample wells in a reaction plate.

The support structure 600 may include a heating element to heat the plurality of reaction cavities 10 at least partially, such as a heat lid. Further the support structure 600 may be disposed above a thermal module (not shown) for applying specific temperature cycles to the plurality of reaction cavities 10. The thermal module may be configured to hold the plurality of reaction cavities 10 in place. Thus, the plurality of reaction cavities 10 may be disposed between the movable mount 400 and the thermal module, and more specifically, on the thermal module underneath the support structure 600.

Figure 2:
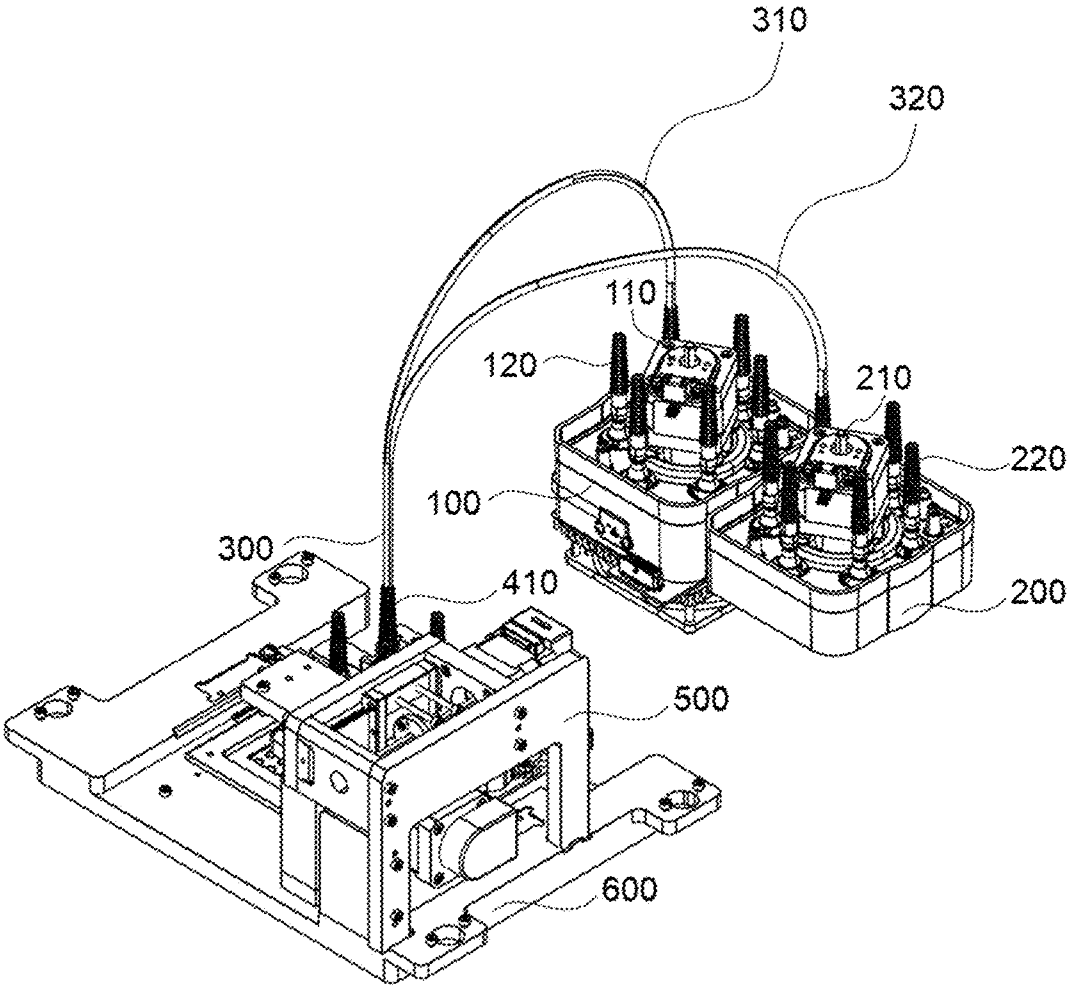
FIG. 2 is a perspective view illustrating the apparatus for detecting optical signals when at least one set of light guides is optically connected to a movable mount, an excitation light engine module and an emission light detector module according to an embodiment of the present disclosure.

FIG. 2 is a perspective view illustrating the apparatus for detecting optical signals when at least one set of light guides 300 is optically connected to a movable mount 400, an excitation light engine module 100 and an emission light detector module 200 according to an embodiment of the present disclosure. Although only one set of light guides 300 is shown, it should be understood that a plurality of sets of light guides 300 may be connected to the movable mount 400 and modules 100 and 200 in the same manner.

As shown in FIG. 2, an excitation light guide 310 may be connected to the excitation light engine module 100 via an excitation light guide connector 120. Likewise, an emission light guide 320 may be connected to the emission light detector module 200 via an emission light guide connector 220. According to an embodiment of the present disclosure, the excitation light guide connector 120 and the emission light guide connector 220 may be conventional connectors used for optical fiber bundles, but are not limited thereto.

According to an embodiment of the present disclosure, the set of light guides 300 may be optical fiber bundles. More particularly, the set of light guides 300 may be bifurcated fiber bundles where the excitation light guide 310 and the emission light guide 320 merge at their proximal ends towards one guide head 410. In other words, the bifurcated fiber bundles may split above the guide head 410, into respective modules 100 and 200.

Figure 3:
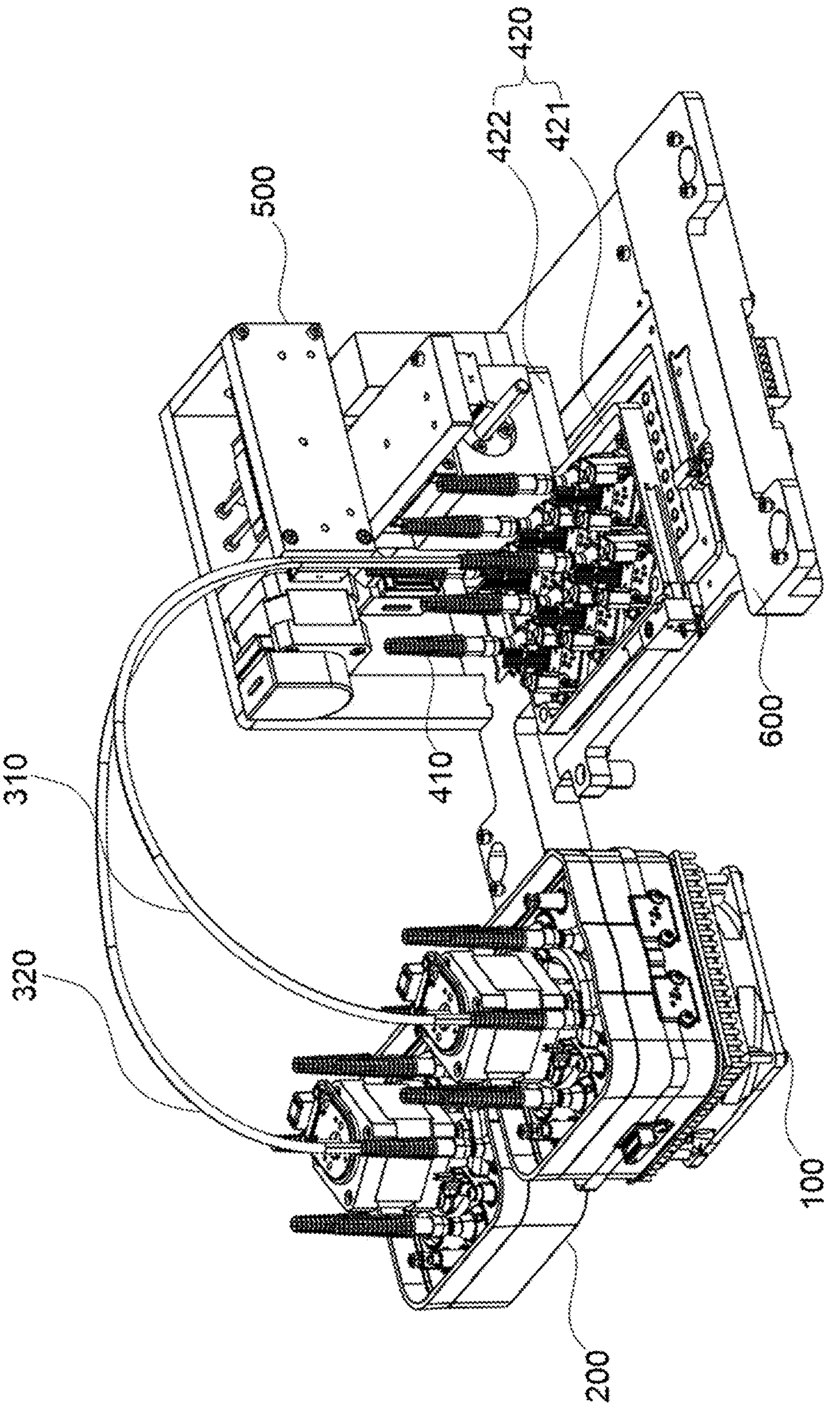
FIG. 3 is another perspective view illustrating the apparatus of FIG. 2.

FIG. 3 is another perspective view illustrating the apparatus of FIG. 2, seen from a different angle. As shown in FIG. 3, the movable mount 400 is further configured to have a mount base 420 which includes a base plate 421 and a base connecting portion 422.

The base plate 421 holds the guide head 410 in place, and the base connecting portion 422 is connected to the motor unit 500 so as to enable the movable mount 400 to be driven by the motor unit 500. The base plate 421 may be formed to have a rectangular shape that is scaled to be in proportion with the area where the plurality of reaction cavities 10 are disposed. More particularly, when a plurality of guide heads 410 are mounted to the base plate 421, the guide heads 410 are mounted such that each of the sets of light guides 300 attached thereto are evenly spaced apart from each other.

This way, light from one set of light guides 300 can be prevented from entering through another set of light guides 300, and errors due to light interference between different sets of light guides 300 can be avoided.

According to an embodiment of the present disclosure, the base connecting portion 422 of the mount base 420 connects the movable mount 400 to the motor unit 500. Preferably, the top surface of the base connecting portion 422 is fixed to the bottom of the motor unit 500, so as to keep the movable mount 400 hovering above a plurality of reaction cavities 10 while the movable mount 400 is driven by the motor unit 500 to follow a predetermined path along the plurality of reaction cavities 10.

Figure 4:
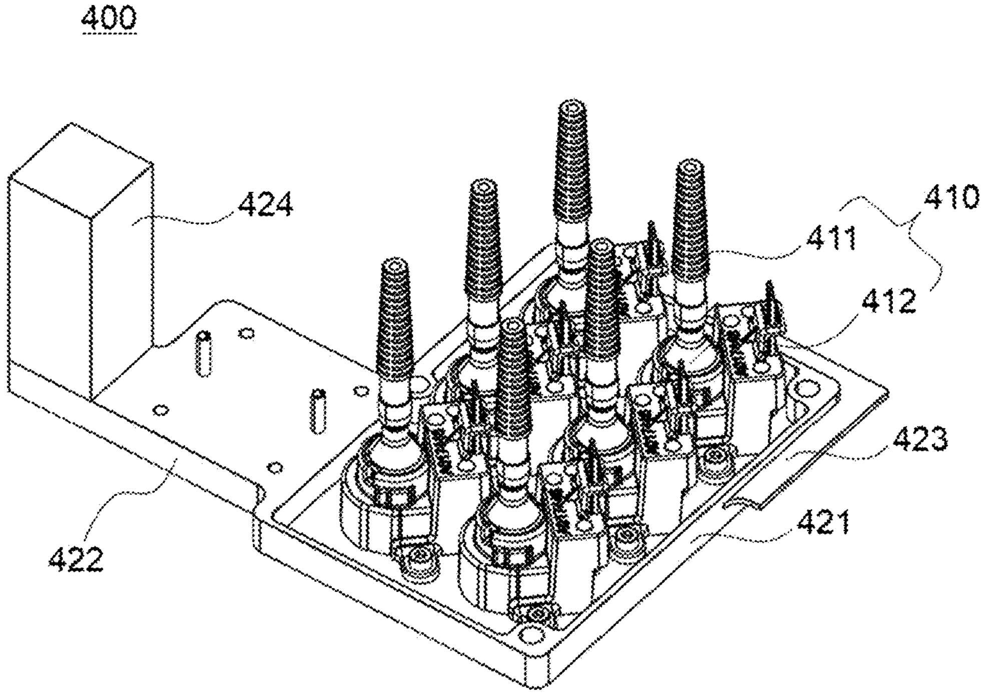
FIG. 4 is a perspective view illustrating a movable mount according to an embodiment of the present disclosure.

FIG. 4 is a perspective view illustrating a movable mount 400 according to an embodiment of the present disclosure. As shown in FIG. 4, a plurality of guide heads 410 may be disposed evenly spaced apart on the base plate 421. Each of the guide heads 410 may have a top portion 411 configured to hold the proximal ends of a set of light guides 300 together, and a bottom portion 412 configured to house components such as lenses and a light meter.

According to an embodiment of the present disclosure, the top portion 411 may be a conventional fiber optic coupler, and the bottom portion 412 may be a conventional fiber optic connector. The light meter within the bottom portion 412 may be a pick-off mirror used to make sure a desired amount of light is properly emitted from the excitation light engine module 100 and routed by the excitation light guide 310. In other words, the proximal end of each excitation light guide 310 and emission light guide 320 are connected to the movable mount 400 via a guide head 410 which functions as a connector having a pick-off mirror for metering light.

Further, the movable mount 400 may be configured to have a mount base 420 which includes a base plate 421, a base connecting portion 422 extending from the base plate 421, and a base edge 423 formed at least partially around the periphery of the base plate 421. According to an embodiment of the present disclosure, the base connecting portion 422 may be a rigid plate used for stably fixing the movable mount 400 to the motor unit 500. The base connecting portion 422 may be fixed to the bottom of the motor unit 500 via fixing means such as screws.

The base edge 423 may be formed protruding from the base plate 421, preferably in both x and y directions at a corner of the base plate 421. In an embodiment of the present disclosure, the base edge 423 may be used together with homing sensors (650 and 660 in FIG. 6) that are disposed on the support structure 600 in predetermined positions. The sensors may be light sensors capable of keeping track of the position of the movable mount 400 as the base edge 423 passes through the homing sensors.

In another embodiment of the present disclosure, a block 424 may be further included for stably limiting the range of movement of the movable mount 400. The block 424 may be formed such that its bottom surface is attached to the movable mount 400, whereas its side surfaces and top surface are slightly spaced apart from the motor unit 500 while the movable mount 400 is operated to move moved in the x and y directions.

Figure 5:
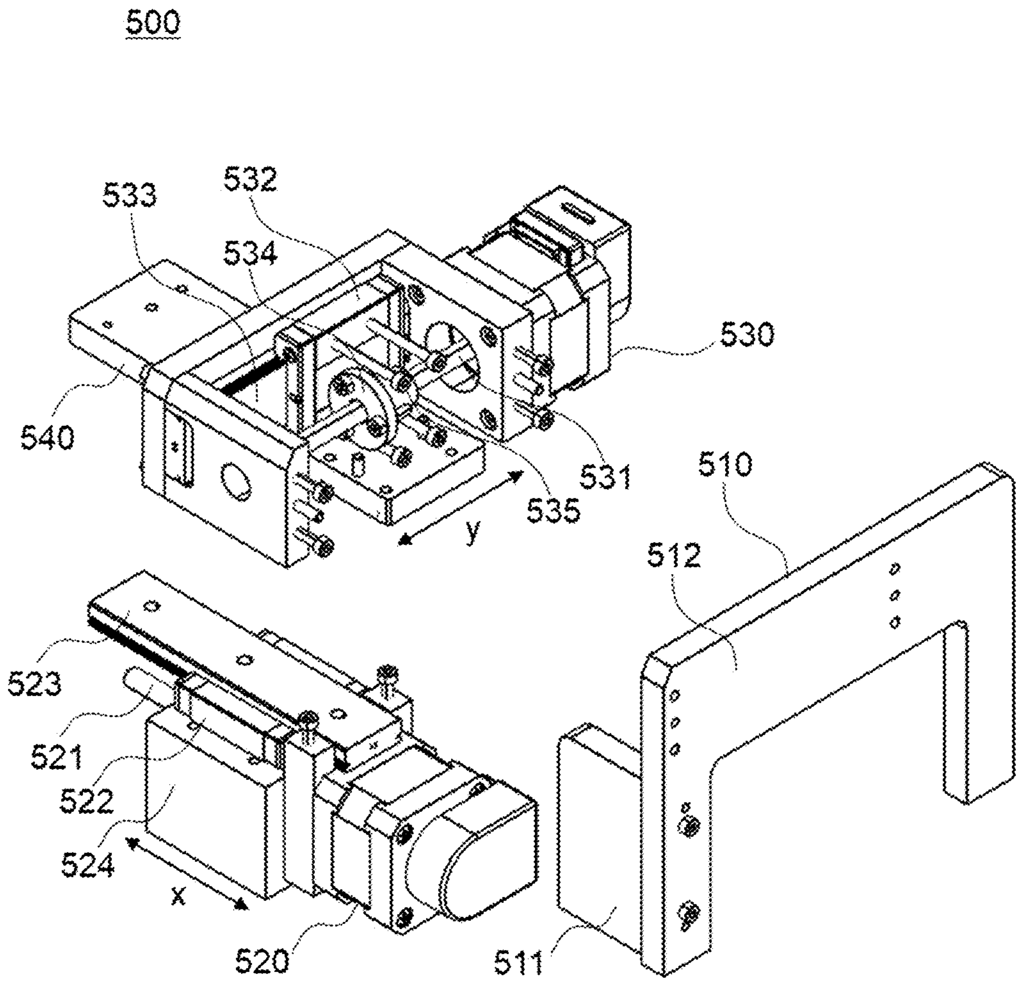
FIG. 5 is an exploded perspective view illustrating a motor unit according to an embodiment of the present disclosure.

FIG. 5 is an exploded perspective view illustrating a motor unit 500 according to an embodiment of the present disclosure. As shown in FIG. 5, the motor unit 500 may include a motor frame 510, an x-axis stepper motor 520, a y-axis stepper motor 530, and a motor connecting plate 540.

The motor frame 510 may be configured to have a vertical portion 511 and a horizontal portion 512, wherein the vertical portion 511 is attached to the horizontal portion 512 and enables the horizontal portion 512 to stand stably on the support structure 600. In an embodiment of the present disclosure, the vertical portion 511 may be fixed orthogonally to the horizontal portion 512.

The horizontal portion 512 may be connected to the y-axis stepper motor 530. Preferably, the y-axis stepper motor 530 is fixed at least partially to the horizontal portion 512 at four points via fixing means, such as screws. This allows the y-axis stepper motor 530 to be fixed on the support structure, and an x-axis stepper motor 520 may be connected to the fixed y-axis stepper motor 530 via a motor connecting plate 540. As shown in FIG. 5, the motor connecting plate 540 may be disposed between the y-axis stepper motor 530 and the x-axis stepper motor 520. Here, the motor connecting plate 540 may be attached to the y-axis moving stage 532 on one side and the x-axis linear guide 523 on the other.

In FIG. 5, a housing (corresponding to the housing 524 of the x-axis stepper motor 520) is omitted for the sake of showing what is inside the housing. Likewise, an x-axis nut and fixing means (corresponding to the y-axis nut 534 and fixing means 535 of the y-axis stepper motor 530) of the x-axis stepper motor 520 is omitted for the sake of showing the connection between the housing 524 and the x-axis moving stage 522.

However, it is preferable for both the x-axis stepper motor 520 and the y-axis stepper motor 530 to each include a nut that moves along a lead screw as the motor is operated, as well as a housing to accommodate the nut, and a plurality of fixing means for fixing the housing to the moving stage.

According to an embodiment of the present disclosure, the motor connecting plate 540 may be connected to the y-axis moving stage 532 (via a housing, not shown) on one side and an x-axis linear guide 523 on the other side. Thus, as the y-axis stepper motor 530 is operated, the motor connecting plate 540 may move in the y-axis direction due to the movement of the y-axis moving stage 532. The movement of the motor connecting plate 540 causes the x-axis stepper motor 520 to move as well, as the x-axis linear guide 523 is moved by the y-axis moving stage 532.

According to an embodiment of the present disclosure, the x-axis stepper motor 520 may be a linear stepper motor which includes an x-axis lead screw 521, an x-axis moving stage 522, an x-axis linear guide 523, and a housing 524 fixed to the x-axis moving stage 522. The x-axis stepper motor 520 operates to rotate the x-axis lead screw 521, thereby moving the x-axis moving stage 522 along the x-axis linear guide 523. The housing 524 may accommodate a nut (like the y-axis nut 534 of the y-axis stepper motor 530) which forces the housing 524 to move, which in turn also forces the x-axis moving stage 522 to move. As shown in FIG. 3, the housing 524 may be attached to the base connecting portion 422 of the movable mount 400. Thus, the movable mount 400 may be moved in the x-direction according to the operation of the x-axis stepper motor 520.

Referring back to FIG. 5, according to an embodiment of the present disclosure, the y-axis stepper motor 530 may be a linear stepper motor which includes a y-axis lead screw 531, a y-axis moving stage 532, and a y-axis linear guide 533. The y-axis stepper motor 530 operates to rotate the y-axis lead screw 531, thereby moving the y-axis moving stage 532 along the y-axis linear guide 533. The y-axis moving stage 532 may be configured to be fixed to a housing (not shown) via a plurality of fixing means 535 such as screws. The housing may accommodate a y-axis nut 534 that moves along the y-axis lead screw 531 which forces the housing to move, which in turn also forces the y-axis moving stage 532 to move.

Also referring to FIG. 3, which shows the motor unit 500 of FIG. 5 connected to the movable mount 400, the housing 524 may be attached to the base connecting portion 422 of the movable mount 400. Such movable mount 400 is attached to the x-axis stepper motor 520 which is also connected to the y-axis stepper motor 530. Thus, the movable mount 400 may be moved in the y-direction according to the operation of the y-axis stepper motor 530.

Figure 6:
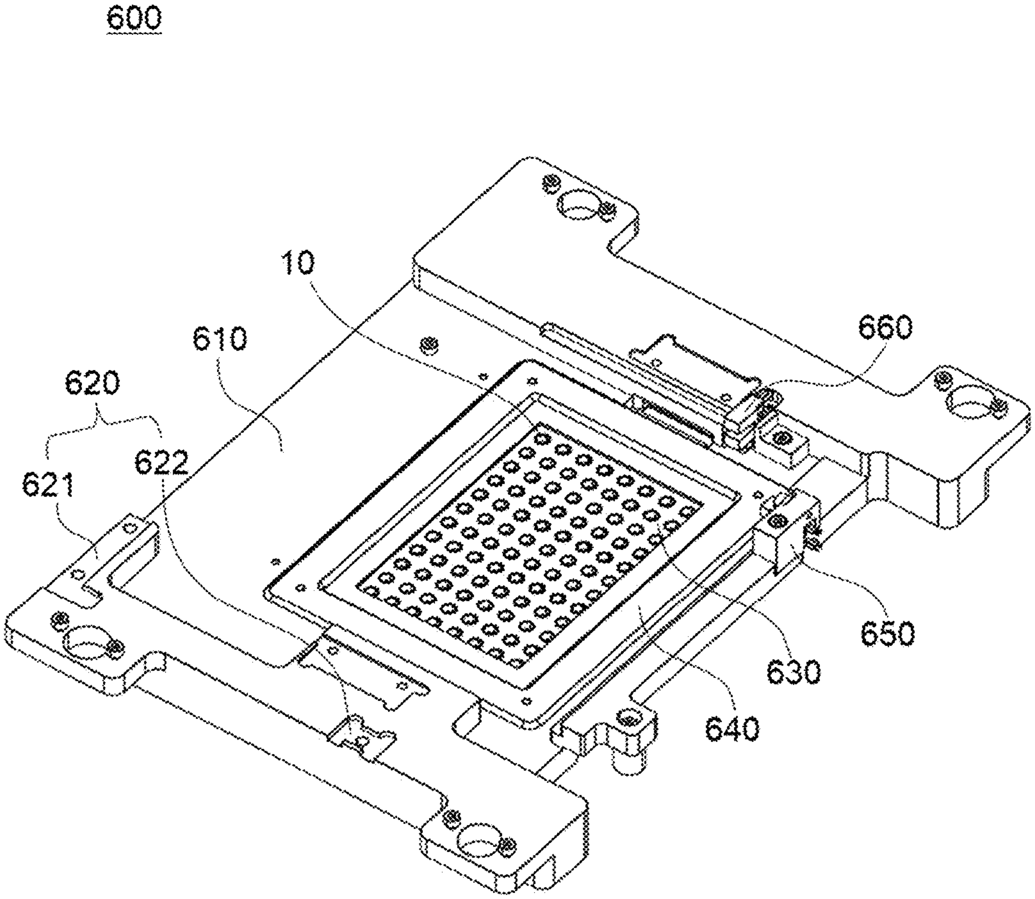
FIG. 6 is a perspective view illustrating a support structure according to an embodiment of the present disclosure.

FIG. 6 is a perspective view illustrating a support structure 600 according to an embodiment of the present disclosure. As shown in FIG. 6, the support structure 600 may include a platform 610 and a motor fixing portion 620.

The platform 610 may be configured to support the movable mount 400 as well as the motor unit 500. More particularly, the motor fixing portion 620 may be formed on the platform 610 to fix the motor unit 500 onto the platform 610. According to an embodiment of the present disclosure, the motor fixing portion 620 may include a first fixing portion 621 and a second fixing portion 622, each formed on the platform 610 having a hollowed-out shape that corresponds to the bottom surface of the motor frame 510. This way, the motor frame 510 may be more stably mounted on the platform 610.

According to an embodiment of the present disclosure, a heat lid 630 and a gasket 640 may be further provided. The heat lid 630 may be a conventional heating element used for pressing a plurality of reaction cavities 10 towards a heat block (not shown) used for performing a nucleic acid amplification reaction. In this case, the heat lid 630 may be used to prevent evaporation or condensation of the samples in the plurality of reaction cavities 10 by providing heat at the top of the reaction cavities 10. Here, the gasket 640 may be used to keep the heat lid 630 in place. The gasket 640 may be formed to enclose the periphery of the heat lid 630 to prevent heat from spreading beyond the area where the reaction cavities 10 are located.

Further, a first edge sensor 650 and a second edge sensor 660 may be provided for the base edge 423 of the movable mount 400. The first edge sensor 650 and the second edge sensor 660 may both be homing sensors used for keeping track of the position of the movable mount 400. As mentioned above, the base edge 423 may be formed protruding from the base plate 421, preferably in both x and y directions at a corner of the base plate 421.

The first edge sensor 650 may be disposed on the platform 610 such that the base edge 423 may pass through the first edge sensor 650 as the movable mount 400 moves in the x-direction. The second edge sensor 660 may be disposed on the platform 610 such that the base edge 423 may pass through the second edge sensor 660 as the movable mount 400 moves in the y-direction. The first and second edge sensors 650 and 660 may be light sensors capable of keeping track of the position of the movable mount 400 as the base edge 423 passes through.

FIG. 7 is a schematic view illustrating a predetermined pattern for irradiating a multiple of reaction cavities at once according to an embodiment of the present disclosure. There may be a plurality of reaction cavities assigned to several sample groups A to F. In this case, the proximal end of each set of light guides 300 may be arranged on the movable mount 400 such that one set of light guides 300 is designated for guiding optical signals to and from one respective sample group A to F.

In the example shown in FIG. 7, there may be 96 reaction cavities in the form of 96-sample wells of a conventional multi-well reaction plate. These 96 reaction cavities may be assigned to several sample groups, for example, to six sample groups marked with boxes labeled as A, B, C, D, E and F. It should be understood that the groups are indicated as such for the sake of convenience. As shown in FIG. 7, there may be 16 reaction cavities arranged in rows and columns of 4 by 4 assigned to each sample group.

According to an embodiment of the present disclosure, the first reaction cavities 11, 12, 13, 14, 15, and 16 of each respective sample group A, B, C, D, E and F are irradiated at the same time by the excitation light engine module 100 via different excitation light guides 310. Here, the excitation light engine module 100 may include one or more light sources, and one set of light guides 300 are installed for each light source. For example, among the plurality of sample groups A to F, a first sample group A and a second sample group B may be respectively irradiated via a first light source and a second light source provided in the excitation light engine module 100.

Likewise, the emission light detector module 200 may include one or more detectors, and preferably, the number of light sources, detectors, and light guides 300 are the same. Since the 96 reaction cavities have been assigned to six different sample groups, it is preferable to have six light sources, six detectors, and six light guides 300 in order to detect emission light from six reaction cavities 11 to 16 simultaneously.

According to an embodiment of the present disclosure, the excitation light engine module 100 may be provided with an excitation rotary wheel having two or more excitation filters, wherein the six light sources each generate light that passes the two or more excitation filters successively as the excitation rotary wheel rotates.

The excitation wavelength provided by the light sources and excitation filters may be, for example, 450-490 nm (for FAM or SYBR Green I), 515-535 nm (for Hex, Vic, Tet or Cal Gold 540), 535-538 nm (for Hex, Vic, or Cal Orange 560), 560-590 nm (for Rox, Texas Red or Cal Red 610), 620-650 nm (for Cy5 or Quasar 670) and 672-684 nm (for Quasar 705). In the example shown in FIG. 7, the wavelength provided by the light sources and excitation filter may be set for detecting five dye-markers, FAM, Cal Orange 560, Cal Red 610, Quasar 670, and Quasar 705.

Likewise, in order to precisely detect emission light of different wavelength spectra, the light detector module 200 may be provided with an emission rotary wheel having two or more emission filters. According to an embodiment of the present disclosure, the excitation rotary wheel and the emission rotary wheel may each provide six different positions, five of them with filters for filtering light to a desired wavelength spectrum.

Thus, an excitation light path provided by the present disclosure may include a light-emitting diode (LED) or other light source, an excitation filter, and an excitation light guide 310. A detection light path may include an emission light guide 320, an emission filter, and a photodiode or other photodetector.

When light from six light sources pass through the excitation rotary wheel, excitation light of six different wavelength spectra is routed to each sample group A to F via a respectively assigned excitation light guide 310.

More specifically, the first reaction cavity 11 to 16 of each sample group A to F are irradiated with excitation light of different wavelength spectra at the same time. Here, one reaction cavity 11 from the first sample group A and one reaction cavity 12 from the second sample group B are irradiated with excitation light of different wavelength spectra at the same time. For example, when the first reaction cavity 11 of sample group A may be irradiated with an excitation light wavelength spectrum for detecting FAM, the first reaction cavity 12 of sample group B may be irradiated with an excitation light wavelength spectrum for detecting Cal Orange 560.

The emission light the first reaction cavity 11 to 16 of each sample group A to F are routed to the emission light detector module 200 via a respectively assigned emission light guide 320. Here, the excitation light guide 310 and emission light guide 320 directed to be in optical communication with the same reaction cavity 10 is referred to as being one set of light guides 300.

Each set of light guides 300, in this case, six set of light guides 300, may be connected to the movable mount 400 such that they are evenly spaced out so as to be able to route excitation light and emission light to the first reaction cavity 11 to 16 of each sample group A to F at the same time. In this embodiment, the movable mount 400 carries the six set of light guides 300, but in some other embodiments, the movable mount 400 may be configured to carry two or more sets of light guides 300.

In other words, each set of light guides 300 is designated for guiding optical signals to and from one sample group A to F having a plurality of reaction cavities, and the two or more sets of light guides 300 are moved by the movable mount 400 upon completing a cycle of irradiating one reaction cavity for each sample group A to F with excitation light of two or more different wavelength spectra. Thus, light emitted from the plurality of reaction cavities assigned into said one sample group is detected via one emission light guide 320.

Once the first reaction cavity 11 to 16 of each sample group A to F are scanned and detected, the movable mount 400 may then move to its next predetermined position. For example, the movable mount 400 may move from the first reaction cavity 11 to the second reaction cavity 21 in sample group A. Here, the movable mount 400 is moved by a motor unit 500, the motor unit 500 having an x-axis stepper motor 520 and a y-axis stepper motor 530. The movable mount 400 is moved in the x-direction by the x-axis stepper motor 520. Likewise, the movable mount 400 is moved in the y-direction by the y-axis stepper motor 530.

Once the second reaction cavity 21 is also scanned and detected with the six different light wavelength spectra with a full revolution of the excitation rotary wheel and the emission rotary wheel, the movable mount 400 may move to the next reaction cavity in the sample group according to a predetermined pattern. A full revolution of the excitation rotary wheel may be considered as one complete cycle of irradiating one reaction cavity 10.

The emission rotary wheel and the excitation rotary wheel may rotate in synchronization, and upon revolution of the emission rotary wheel and the excitation rotary wheel, the movable mount 400 may move the sets of light guides 300 to be in optical communication with another reaction cavity until all the reaction cavities in one sample group have been irradiated.

More specifically, the movable mount 400 may move along a predetermined pattern as shown in FIG. 7 marked with arrows on the plurality of reaction cavities in the sample groups A to F. As all of the sets of light guides 300 are fixed on and carried by the movable mount 400, they can move in unison over the sample groups A to F. Although the pattern marked with arrows indicates that the movable mount 400 moves across to the left in the x-direction and then down in the y-direction, and then right in the x-direction and the down again in a zig-zag-like pattern, the pattern may vary in other embodiments and is not limited thereto.

Consequently, the emission light of two or more different wavelength spectra may be detected at the same time via the sets of light guides 300, each connected to the emission light detector module 200.

Figure 8:
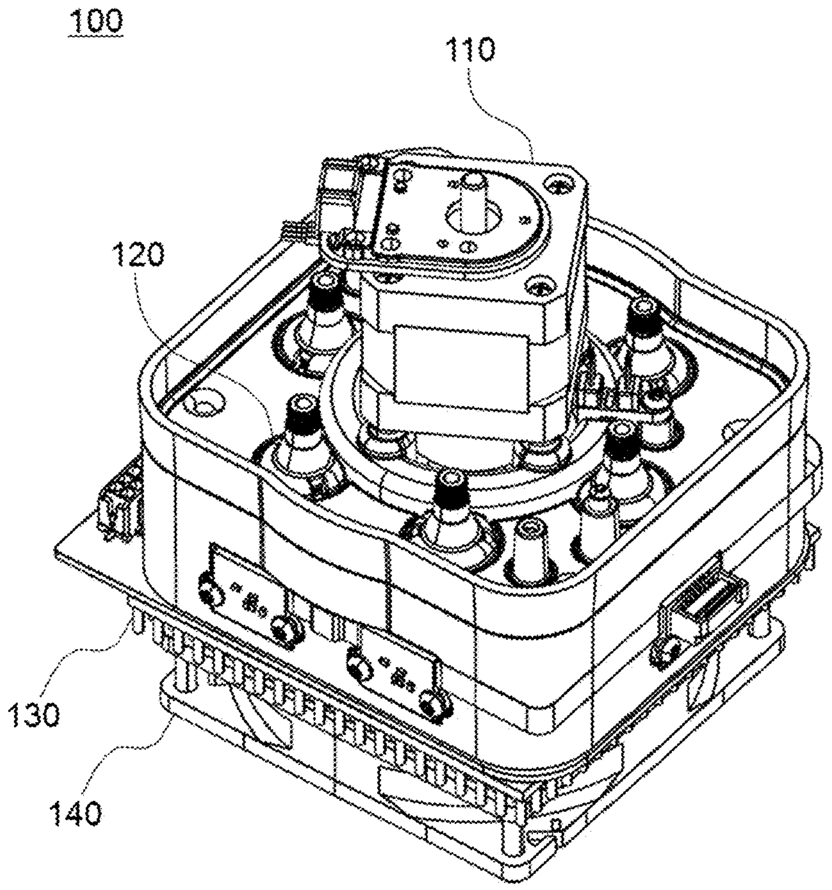
FIG. 8 is a perspective view illustrating an excitation light engine module according to an embodiment of the present disclosure.

FIG. 8 is a perspective view illustrating an excitation light engine module 100 according to an embodiment of the present disclosure. The excitation light engine module 100 may include an excitation filter motor 110 and an excitation light guide connector 120. The excitation light engine module 100 may also include a heat sink 130 and a cooling fan 140 for managing heat from the light sources more efficiently.

The excitation filter motor 110 is used to rotate the above-mentioned excitation rotary wheel (not shown). The excitation light guide connector 120 is used to connect the excitation light guide 310 to the excitation light engine module 100. As shown in FIG. 8, six excitation light guide connectors 120 may be disposed evenly around the excitation filter motor 110, each used to connect a designated excitation light guide 310. The excitation filters held by the excitation rotary wheel may be arranged to be vertically aligned to the six excitation light guide connectors 120 disposed on the excitation light engine module 100.

In some embodiments, the excitation light engine module 100 may include two or more light sources and an excitation rotary wheel having two or more excitation filters, wherein the two or more light sources each generate light that passes the two or more excitation filters successively as the excitation rotary wheel rotates.

Figure 9:
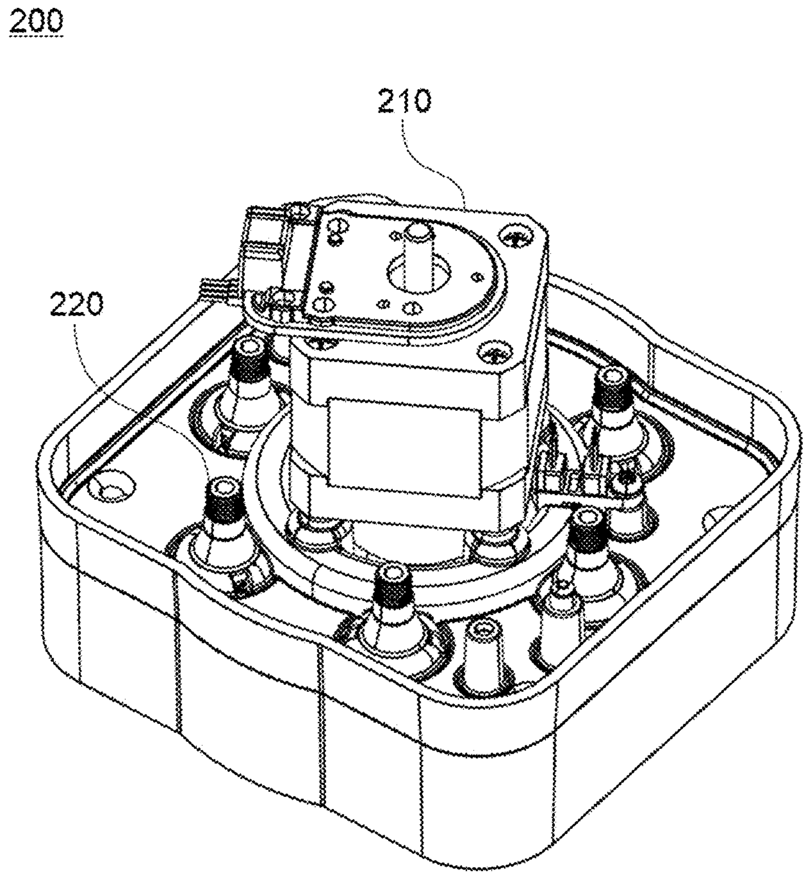
FIG. 9 is a perspective view illustrating an emission light detector module according to an embodiment of the present disclosure.

FIG. 9 is a perspective view illustrating an emission light detector module 200 according to an embodiment of the present disclosure. The emission light detector module 200 may include an emission filter motor 210 and an emission light guide connector 220. The emission filter motor 210 is used to rotate the above-mentioned emission rotary wheel (not shown). The emission light guide connector 220 is used to connect the emission light guide 320 to the emission light detector module 200.

As like the excitation light guide connector 120, six emission light guide connectors 220 may be disposed evenly around the emission filter motor 210, each used to connect a designated emission light guide 320. The emission filters held by the emission rotary wheel may be arranged to be vertically aligned to the six emission light guide connectors 220 disposed on the emission light detector module 200.

In some embodiments, the emission light detector module 200 may include two or more detectors and an emission rotary wheel having two or more emission filters, wherein the two or more detectors each detects light that passes the two or more emission filters successively as the emission rotary wheel rotates.

What is claimed is:

1. An apparatus for detecting optical signals, comprising:

a movable mount for carrying two or more sets of light guides, each set of light guides having an excitation light guide and an emission light guide;

an excitation light engine module comprising two or more light sources and an excitation rotary wheel with two or more excitation filters, for providing light to the excitation light guide of each set of light guides, wherein one excitation light quide is installed for each light source; and an emission light detector module comprising two or more detectors and an emission rotary wheel with two or more emission filters, for detecting light from the emission light guide, wherein one emission light quide is installed for each detector, and a motor unit for moving the movable mount, the motor unit having an x-axis motor and a y-axis motor, wherein each distal end of the excitation light guide and the emission light guide are respectively connected to the excitation light engine module and the emission light detector module, wherein each proximal end of the excitation light guide and the emission light guide are both connected to the movable mount, and moved via the movable mount to be in optical communication with one reaction cavity at a time, among a plurality of reaction cavities wherein the plurality of reaction cavities are assigned into a plurality of sample groups, and the proximal end of each set of light guides is arranged on the movable mount such that one set of light guides is designated for guiding optical signals to and from one respective sample group having a plurality of reaction cavities, wherein the two or more sets of light guides are connected to the movable mount via two or more guide heads, with one set of light guides attached to each of the guide heads, wherein the two or more sets of light guides attached to the guide heads are evenly spaced apart from each other so as to be able to route excitation light to one reaction cavity from each of the sample groups at the same time.

2. The apparatus of claim 1, wherein the movable mount moves the proximal end of each set of light guides to follow a predetermined path designed for positioning each set of light guides to be in optical communication with one reaction cavity at a time.

3. The apparatus of claim 1, wherein among the plurality of sample groups, a first sample group and a second sample group are respectively irradiated via a first light source and a second light source provided in the excitation light engine module.

4. The apparatus of claim 3, wherein one reaction cavity from the first sample group and one reaction cavity from the second sample group are irradiated with excitation light of different wavelength spectra at the same time.

5. The apparatus of claim 3, wherein emission light emitted from one reaction cavity from the first sample group and one reaction cavity from the second sample group are respectively detected via a first detector and a second detector provided in the emission light detector module.

6. The apparatus of claim 1, wherein the motor unit is connected to a support structure disposed above a thermal module for applying specific temperature cycles to the plurality of reaction cavities.

7. The apparatus of claim 6, wherein the plurality of reaction cavities is disposed underneath the support structure, between the movable mount and the thermal module.

8. The apparatus of claim 1, wherein the proximal end of each excitation light guide and emission light guide are connected to the movable mount via a connector having a pick-off mirror for metering light.

9. The apparatus of claim 1, wherein the number of light sources, the number of detectors, and the number of sets of light guides are the same.

10. The apparatus of claim 1, wherein the position of the two or more sets of light guides is moved within each respective designated sample group by the movable mount upon completing a cycle of irradiating excitation light of two or more different wavelength spectra for each reaction cavity.

11. The apparatus of claim 10, wherein the excitation light of two or more different wavelength spectra is irradiated at the same time via the two or more sets of light guides, each connected to the excitation light engine module.

12. The apparatus of claim 11, wherein the two or more light sources each generate light that passes the two or more excitation filters successively as the excitation rotary wheel rotates.

13. The apparatus of claim 10, wherein emission light of two or more different wavelength spectra is detected at the same time via the two or more sets of light guides, each connected to the emission light detector module.

14. The apparatus of claim 13, wherein the two or more detectors each detects light that passes the two or more emission filters successively as the emission rotary wheel rotates.

* * * * *